Dec. 6, 1966   H. R. IHRIG   3,290,156
METHOD FOR HANDLING EGGS
Filed Oct. 12, 1961   2 Sheets-Sheet 2
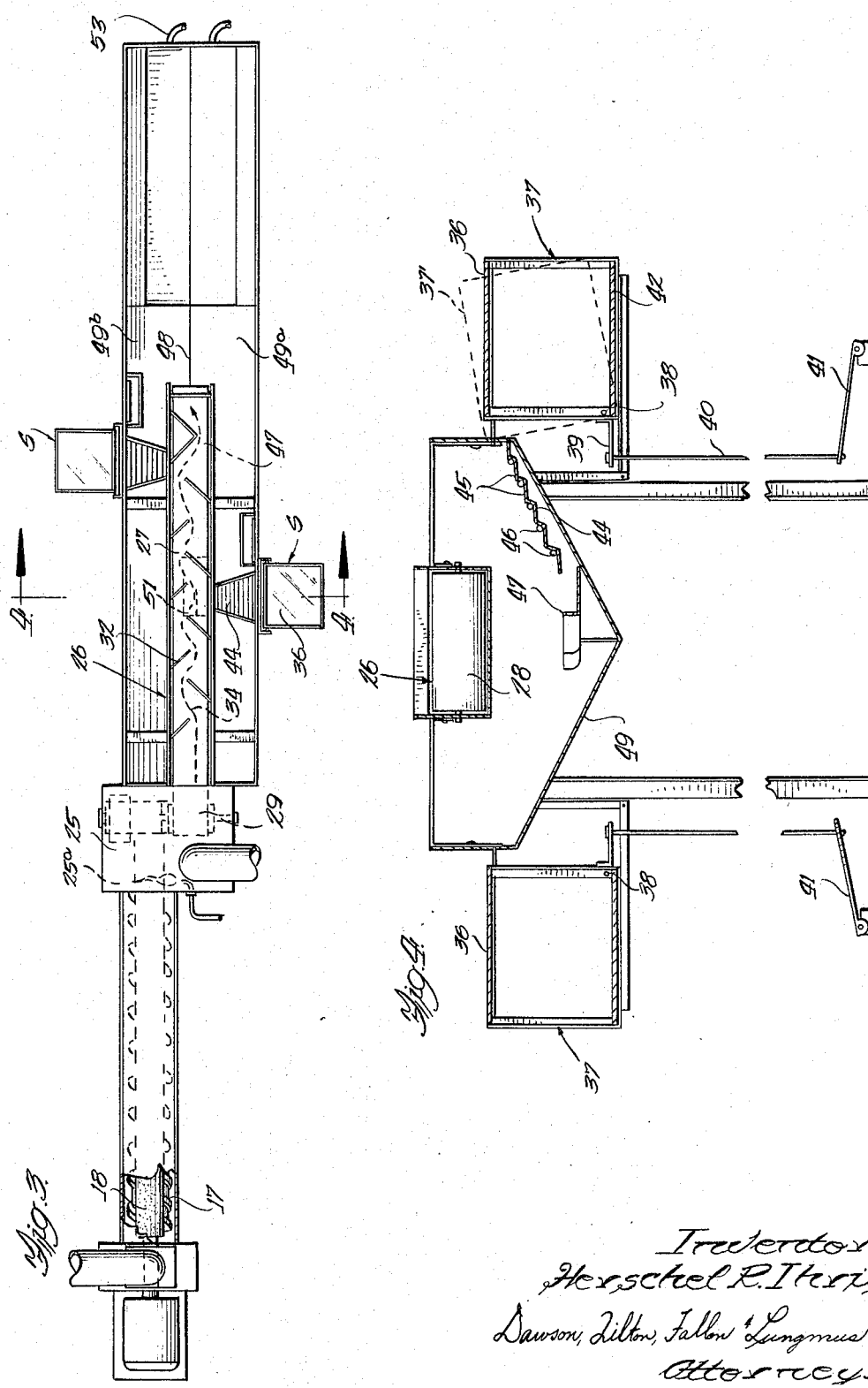

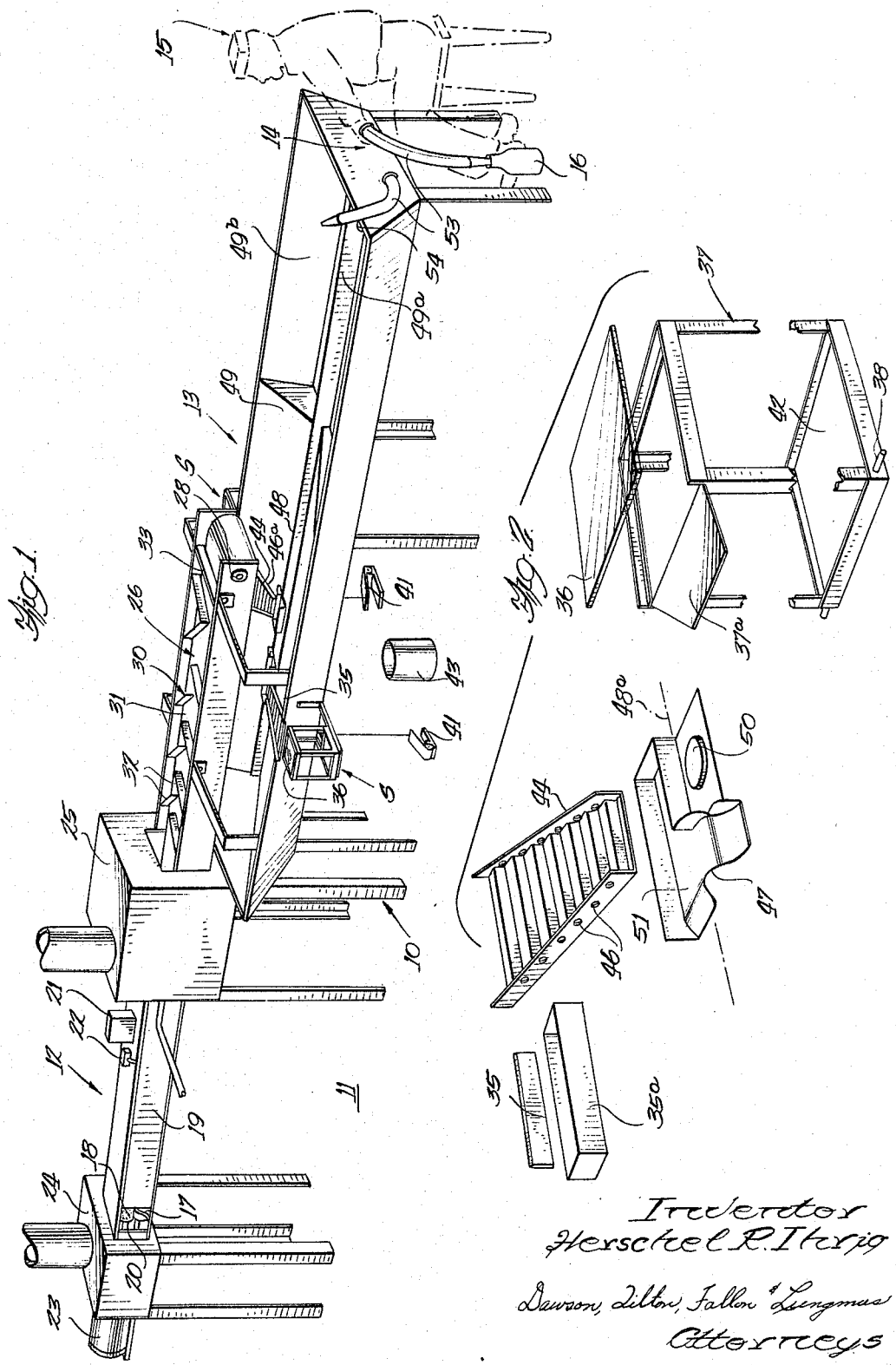

United States Patent Office 3,290,156
Patented Dec. 6, 1966

3,290,156
METHOD FOR HANDLING EGGS
Herschel R. Ihrig, Golden, Ill.
Filed Oct. 12, 1961, Ser. No. 147,404
2 Claims. (Cl. 99—113)

This invention relates to a method and apparatus for handling eggs, and, more particularly, to a method and apparatus for bottling eggs.

In the use of eggs, particularly in restaurants, hotels, etc., there is a considerable wastage because the eggs are not of uniform high quality insofar as yolk appearance, yolk strength, etc., are concerned. When a substandard yolk egg is determined, it must be removed from the frying-pan or griddle, necessitating lost time, resulting in inconvenience and oftentimes delay to the diner. Still further, it will be appreciated that when two eggs are ordered and the second egg is substandard and has to be removed, there is usually a difference in the resultant two cooked eggs.

Expedients have been advanced in the past for packaging whole, shelled eggs, but each of such expedients has suffered from one or more drawbacks, so that there has been relatively little, if any, use made of such expedients. For one thing, there has been a tremendous wastage in the processing procedure wherein eggs are shelled and then packaged in transparent containers.

It is an important object of this invention to provide a novel method and apparatus for the handling of eggs, particularly the packaging of eggs in transparent containers, so that the problems outlined above relative to both whole, unshelled eggs, and previously provided packaged eggs, can be avoided.

Another object of this invention is to provide a method and apparatus for packaging whole shelled eggs in plural quantities in a single container, such as a glass bottle, wherein the integrity of a given egg is essentially preserved.

A further object of the invention is to provide a method and process for handling eggs wherein a novel test is applied to facilitate ascertainment of the yolk strength.

Other objects and advantages of this invention may be seen in the details of construction and operation set down in this specification.

The invention will be explained in conjunction with an illustrative embodiment of a machine for the handling of eggs, as shown in the accompanying drawing, in which—

FIG. 1 is a perspective view of a machine for the handling of eggs;

FIG. 2 is an enlarged perspective view of certain of the tools or machine elements employed for the handling of eggs;

FIG. 3 is a top plan view of the machine seen in FIG. 1; and

FIG. 4 is an enlarged sectional view such as would be seen along the sight line 4—4 of FIG. 3.

Although the mechanism by which the invention operates is imperfectly understood, it is believed that there is a certain criticality in the age of an egg which determines whether it is suitable for incorporation into an artificial package. For example, in an operation where 3,000 to 5,000 eggs are broken per hour, for bottling in groups of six, ten, twenty, etc., I have noted that the loss because of yolk breakage generally falls in the range of 10% to 15% if the eggs are less than twenty-four hours old. The loss rises sharply if the eggs are held a longer time, averaging in excess of 25% if the holding period is even as little as 36 to 48 hours prior to breaking. The "freshly bottled" eggs possess a further advantageous characteristic in that the albumin associated with a given yolk has been found to remain therewith, even after storage in bottled form for several months. This makes it possible to literally "pour" single eggs sequentially from the bottle, knowing that each of the eggs within the bottle is of a desirable standard, the bottle permitting visual ascertainment by the cook or chef at the time of use, if such is desired.

In the practice of the invention, I have found it advantageous to use apparatus of the character embodied in the accompanying drawing. In the illustrated embodiment, the numeral 10 designates generally a frame supporting the apparatus above a floor 11. The left-hand end of the frame supports a sterilization unit generally designated 12, while the right-hand end of the frame (as seen in FIG. 1) supports a processing portion of the apparatus generally designated 13.

As can be seen from FIG. 1, the extreme right-hand end of the portion 13 is equipped with discharge means generally designated 14 whereby a bottler 15 is enabled to fill a transparent glass or suitable plastic bottle 16 with a dozen eggs. In general, therefore, the apparatus supported by the frame 10 provides for the entire handling of eggs to be bottled.

Eggs are introduced into the sterilization apparatus 12, the eggs previously having been chilled to below 60° F. (and optimally in the range 45–50° F.) to comply with U.S.D.A. requirements. The eggs are traveled along a screw conveyor 17 in contact with a rotating brush 18, both of which are suitably journaled within a housing 19. The housing 19 also supports a spray header 20, which is supplied with cleansing fluid from a tank 21 by means of the pump 22.

After passing through the spray, which can be conveniently removed in liquid form by means of a pump 23 and the vapor form removed by an exhaust fan 24, the eggs proceed through a short drying oven 25 where they are briefly in contact with a gas flame 25a. Thereafter, the eggs roll by gravity onto a conveyor generally designated 26. The conveyor 26 is seen to include an endless, generally horizontally-disposed belt 27 mounted on an idler roller 28 and a drive roller 29. The drive roller 29 is driven by means of a motor (not shown).

The frame 10 provides a baffling arrangement generally designated 30 (see FIG. 3) on the upper run 31 of the belt 12. The baffling arrangement 30 includes a plurality of staggered, inwardly-extending arms 32, which direct the eggs through a tortuous path indicated in dotted line and designated by the numeral 34, the path stopping at a crossbar 33. This effectively prevents build-up of eggs at the end of the conveyor 26.

Positioned along the length of the conveyor 26 are a plurality of egg-cracking stations generally designated "S," only two of which are shown. It will be appreciated that a greater number may be employed, each girl at each station having the same distance to reach in performing the breaking operation. At each station, there is provided on the frame 10 a cracking knife 35 (see FIG. 1). The knife is essentially a rectangular flat member having its sharpened edge disposed horizontally, the plane of the knife blade being disposed generally vertically. Once an egg has been cracked on the knife edge 35, the fluid egg contents are deposited on the viewing plate 36. The viewing plate 36 is provided as part of a subframe generally designated 37 and which includes a plurality of vertically-extending members interconnected to provide, in effect, an open box. The subframe 37 is hinged to the frame 10 as at 38 and is equipped with a lever arm 39 which is in turn connected by means of a connecting rod 40 to a foot pedal 41. It will thus be apparent that depression of the foot pedal 41 results in tilting the subframe 37 and thus the viewing plate 36 to the dotted line position indicated in FIG. 4 so as to cause the shells and fluid eggs to flow by gravity off of the viewing plate 36.

The subframe 37 includes adjacent its lower end a plane mirror 42 which permits the egg cracker to view the underside of the egg so as to ascertain any possible defects. Should an egg be substandard (as by having a bloody yolk), the viewing plate 36 may be lifted out of the subframe 37 and the egg placed in a container 43. Such eggs thereafter may be used for other processing purposes—powdered eggs, scrambled eggs, etc.

The processing apparatus 13 includes for each station S a ramp or inclined plane 44. The plane 44 is located on the frame 10 in such a position as to receive a shelled fluid egg from the plate 36 when the plate has been tilted for the dotted line position of FIG. 4. As best seen in FIG. 2, the ramp 44 includes a series of steps 45, causing the fluid egg to be subjected to a series of different gravitational forces, thereby testing the integrity and strength of the yolk. The steps 45 in the ramp 44 are relatively small when compared with the egg thickness, the height of each corrugation being of the order of ⅜", with the plane of the ramp being inclined at about 30° to horizontal.

Each ramp 44 is equipped along each side with a plurality of drain holes 46 which permit the draining off of the so-called "thin albumin."

In the illustration given, the ramps 44 each discharge into a scale 47 which is balanced on a knife edge 48 provided as part of a reservoir 49. The reservoir 49 has therein compartments 49a and 49b defined in part by the wall providing the knife edge 48. As seen in FIG. 2, wherein the position of the knife edge and supporting arm are designated by the numeral 48a, the scale is equipped with a counterweight 50. An egg falling within the scale trough 51 is thereby balanced against the counterweight 50 and, depending on the weight of the liquid egg when it is in the trough 51, will fall either into compartment 49a or compartment 49b. Excellent results are obtained when the counterweight 50 is sized to separate eggs above and below 1¾ oz. in weight. Thus, in the illustration given, eggs less than 1¾ oz. in weight are deposited into compartment 49b, while the heavier eggs go into compartment 49a.

The bottom wall 52 of the reservoir 49 is inclined so as to direct eggs toward the discharge means 14 of FIG. 1. The discharge means 14 includes a pair of plastic hoses 53, each equipped with clips 54 and which communicate with the interior bottom of the compartments 49a and 49b. Thus, it is possible for the bottler 15 to selectively withdraw eggs from the compartments 49a and 49b so as to substantially fill a bottle 16. For example, after eight or nine eggs have been taken from one or the other compartments 49a or 49b, it may require withdrawing the remaining eggs from the other compartment in order to achieve substantial filling of the bottle 16.

Each ramp 44 in the station S on the side of the apparatus 13 corresponding to the counterweight side of the scale 47 is equipped with a drain trough as at 46a. It will be appreciated that the thin albumin, if permitted to drain directly from the ramp 44 where the ramp extends partway over the scale 47, would fall on the scale and thus tend to destroy its accuracy.

It should also be noted that the apparatus employed for the crackling, testing, and weighing of the fluid eggs is all readily removable from the apparatus so as to facilitate cleaning. This insures sterile operation, and it facilitates cleansing, for example, of the ramp or scale should an egg yolk break while resident therein.

It is believed that the invention can be further understood by consideration of a specific example of the operation thereof, and for that purpose the following is given:

*Example*

Conventionally, eggs are gathered at 10:00 A.M., 2:00 P.M., and 4:00 P.M. from the laying hens. Generally, three-fourths of the eggs to be laid are laid before noon. However, with advances in artificial lighting, chicken housing, etc., it is possible to adjust the laying schedule to a particular farmer's preference. However, irrespective of the laying cycle, the eggs, shortly after gathering, are taken to the farmer's holding room, which is usually maintained at a dry bulb temperature of 50–55° F. and a relative humidity of 85–90%. Within 24 hours, the eggs are transported by refrigerated truck or other means to the processing plant, where usually they are then placed in the plant's holding room. Conventionally, the eggs are held at least four hours in the holding room of the plant, where the dry bulb temperature is also in the range 50–55° F. and with even a higher relative humidity, of the order of 95%, to make sure that the body of the egg reaches the ambient temperature.

Within twenty-four hours of laying, the eggs are sterilized as in the apparatus generally designated 12. At this point, it is often the practice to weigh the eggs in groups of 180 eggs (15 dozen), so as to determine their liquid weight, the weight upon which the farmer is paid. The eggs are then sequentially passed through the sterilization apparatus 12, where they are sprayed with a bactericide cleanser, a conventional product for this use being Germex, which is a quaternary ammonium salt. Usually, this bactericide is diluted with 100 parts of tap water at a temperature of 165° F. The residence time of the eggs within the sterilizer is rather brief, the total time elapsed between entry into the sterilizing apparatus 12 to the time the eggs leave the reservoir 49 being of the order of two to five minutes. Thus, the internal egg temperature is not appreciably changed by contact with the hot sterilizing liquid. After being cleansed and sterilized in the apparatus 12, the eggs roll past a butane burner in the oven 25, where they are flash-dried. Again, the residence time is such as not to appreciably change the egg internal temperature, which is still below about 60° F.

The eggs then accumulate on the conveyor 26 between the baffle elements 30 and are picked up individually by the persons who crack the eggs at the various stations S. The cracked shells are placed in a cup 35a, while the egg bodies are placed on the plate 36. It will be noted from a consideration of FIG. 2 that each subframe 37 is equipped with a lip or slide 37a which directs the eggs onto the ramp 44 when the subframe 37 has been pivoted to the dotted line position designated 37' in FIG. 4.

If, however, a defect is noticed in an egg, the person doing the cracking can immediately raise the viewing plate 36 from its mounting in the subframe 37 and drop the egg into the waste container 43. Provided adjacent the frame 10, but not shown, is a water spray which can be employed to cleanse the surface of the plate 36, if the same is desired.

In the usual course, the egg is acceptable, and thereupon the foot pedal 41 is depressed to tilt the subframe 37 to the dotted line position designated 37' in FIG. 4. The egg thereupon slides down the corrugated ramp 44 and onto the scale 47. During its passage down the corrugated ramp 44, the thin albumin flows off through the side openings 46 and into the adjacent compartment 49a or 49b, as the case may be. Here, it will be appreciated that the thin albumin from an egg does not necessarily go into the same compartment as the egg itself, but with a volume of production and with stations S on both sides of the reservoir 49, the thin albumin is evenly distributed relative to the distribution of the eggs.

The egg, upon reaching the scale 47, is "classified"—weighed—according to a predetermined standard, which conventionally may be 1¾ ounces. The heavier eggs in the illustration given counteract the counterweight 50 and tilt the scale so as to flow into the compartment 49a. The scale 47 is biased so that the underweight eggs do not disturb the scale's position and thus automatically flow into the compartment 49b.

The eggs then flow into the reservoir 49, which, in the illustration given, has a 200-egg capacity, after which the eggs can be selectively withdrawn by the bottler 15. After the prescribed number of eggs has been introduced into the bottle 16, the same is suitably capped, as by an aluminum roll-on cap known in the trade as an "aluminum seal-cap." Alternatively, screw-type caps may be employed and corresponding variations may be made in the container, such as using a thin-walled disposable container. Optimally, the bottle inside diameter at the neck measures about 38 millimeters, and where conventional milk-type bottles are involved, this represents the outside diameter of the order of 51–56 mm. Thereafter, the bottled eggs are placed under refrigeration in the order of 40–50° F., wherein they can be maintained for up to about two months without appreciable deterioration.

From storage, the eggs are usually transported in refrigerated trucks to hotels, restaurants, etc., where they are employed in cooking merely by pouring the eggs out of the bottle one at a time, at which time the egg and its associated albumin flow out as an integral mass and without including the albumin from an adjacent egg.

By the process, I am able to maintain the pH of the white or albuminous portion of the egg close to that characteristic at the time of laying, the white portion having a pH of 7.6 at the time of laying and the inventive process maintaining this pH at about 7.8. This is believed to be effective in maintaining the white against bacterial degradation and thus maintain the integrity of the egg so as to facilitate pouring of one egg at a time.

While, in the foregoing specification, I have set down a detailed description of an embodiment of the invention for the purpose of illustrating the same, many variations in the details herein given may be made by those skilled in the art without departing from the spirit and scope of the invention.

I claim:
1. In an egg-handling process, the steps of chilling freshly-laid eggs and within about 36 hours thereafter and while said eggs are at a temperature of less than about 60° F., cleansing the exteriors thereof, cracking said eggs to remove shells therefrom, flowing said eggs over a stepwise path to test the yolk integrity, introducing a plurality of eggs into a container, and sealing said container.

2. A method of handling eggs, the steps of providing shelled eggs less than about 24 hours old and at a temperature in the range of 45–50° F., traveling said eggs down an incline prior to bottling to ascertain yolk integrity, and bottling said eggs.

References Cited by the Examiner

UNITED STATES PATENTS

| 2,160,604 | 5/1939 | Stamper | 99—196 |
| 2,359,006 | 9/1944 | Schneider | 146—2 |
| 2,389,630 | 11/1945 | Mitton | 146—2 |
| 2,496,755 | 2/1950 | Schwartzberg | 99—196 |
| 2,525,096 | 10/1950 | Damuth | 99—196 |
| 2,813,800 | 11/1957 | Rasky | 99—196 |
| 2,876,110 | 3/1959 | Stadelman et al. | 99—161 X |
| 2,923,631 | 2/1960 | Kauffman et al. | 99—161 X |

FOREIGN PATENTS 293,794  10/1929  Great Britain.

OTHER REFERENCES

Lee, E. H.: "The Bakers Digest," June 1948, pages 21 to 24, inclusive, article entitled, "Frozen Eggs."

"The Freezing Preservation of Foods," by D. K. Tressler et al., 1943, published by The Avi Publishing Company, Inc., New York, page 531.

RAYMOND N. JONES, *Acting Primary Examiner.*

HYMAN LORD, A. LOUIS MONACELL, *Examiners.*